Nov. 29, 1949   H. E. READ   2,489,541

MOLDING MATERIAL

Filed Jan. 3, 1946

Inventor:
Harold E. Read,
By Cushman, Darby & Cushman
Attorneys.

Patented Nov. 29, 1949

2,489,541

UNITED STATES PATENT OFFICE 2,489,541

MOLDING MATERIAL

Harold E. Read, Hopewell, Va., assignor, by mesne assignments, to Continental Can Company, Incorporated, New York, N. Y., a corporation of New York Application January 3, 1946, Serial No. 638,863

3 Claims. (Cl. 154—46)

This invention relates to molding materials and in particular to fibrous sheets for use in molding operations, such as compression molding of structures having complex curved portions.

A principal object of this invention is the provision of new and useful molding materials. A further object is the provision of flexible, sheet-like structures of fibrous materials which may be molded into desired shapes by the application of heat and pressure, particularly shapes of complex nature.

Still further objects include the provision of a process for the production of the aforesaid molding materials and the provision of rigid, molded articles of high structural strength composed of fibrous sheet materials. Other objects and the entire scope of applicability of the present invention will become apparent from the detailed description given hereinafter.

The above objects are accomplished according to the present invention by forming an expanded, open mesh, fibrous sheet element and uniting surface sheets of fibrous material, comprising a substantial amount of synthetic resin to this expanded element, so as to form a sheet-like lamination which may be molded under heat and pressure to produce a rigid structure.

A more complete understanding of the products and process of this invention may be had by reference to the attached drawings, in which.

Referring more particularly to the drawings, 1 designates an expanded fibrous sheet with open meshes 2. This expanded fibrous sheet may be made from any fibrous material of suitable thickness and weight, such as cotton or wool felt or paper sheets of suitable thickness produced either on a cylinder or Fourdrinier machine. The preferred material from which the expanded sheets of this invention are made is heavy kraft paper.

Figure 1:
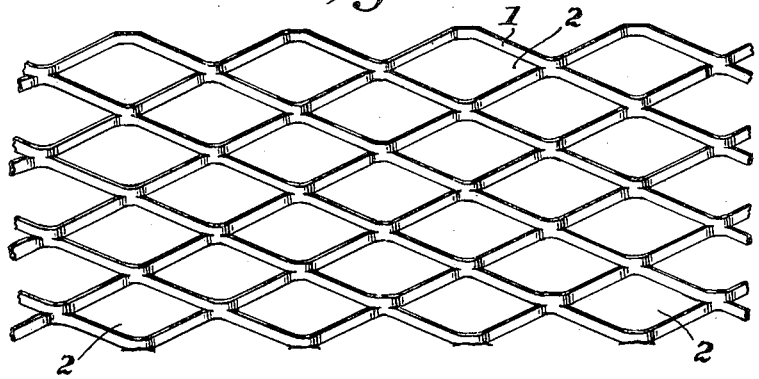
Figure 1 is a plan view of an expanded, open mesh, fibrous sheet of this invention.

The expanded sheets are made by cutting a sheet of the desired fibrous material with regularly spaced slits of short, uniform length in staggered relation and, thereafter, subjecting the slitted sheet to sufficient transverse force to open up the slits into a mesh-like structure. Such an operation results in the production of an expanded fibrous sheet, as shown in Figure 1.

Figure 2:
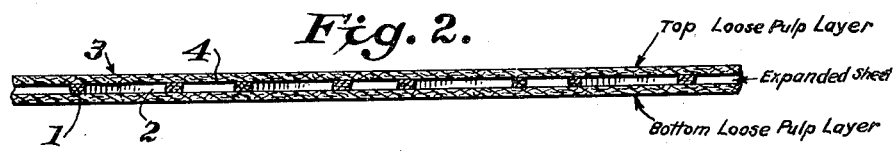
Figure 2 is a cross sectional view of a sheet of the molding material of this invention.

The molding materials of this invention are illustrated in Figure 2. The multi-ply material, which is designated as 3 in the drawing, comprises an interlayer of the indicated expanded, fibrous sheet 1, which is surfaced on both sides with a continuous sheet of fibrous material 4, with or without a synthetic resin. As in the case of the expanded sheet, the surface sheets may be made from any suitable fibrous material, such as cotton or wool felt, paper or pulp board, or the like. Preferably, the surface sheets are made from pulp board, particularly kraft pulp board.

Figure 3:
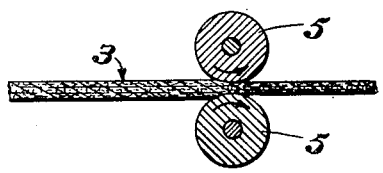
Figure 3 is a diagrammatic cross sectional view of one operational step in the process of the formation of the molding material, shown in Figure 2.
Figure 4:
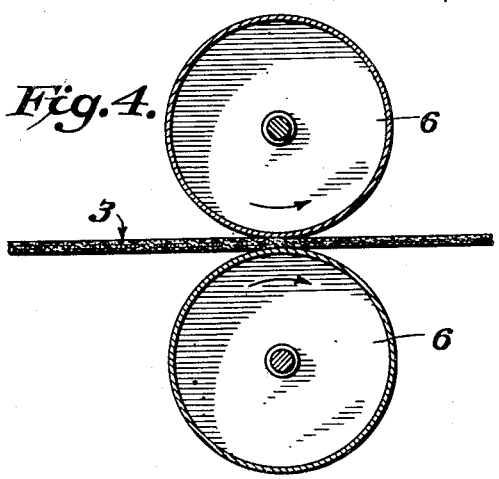
Figure 4 is another diagrammatic cross sectional view of an operational step in the process of the formation of the molding material shown in Figure 2.

The fibrous surface sheets may be applied to the expanded interlayer in a number of ways. Thus, a dry pulp board, made from unsized kraft pulp, may be applied to both surfaces of the expanded sheet and the three elements of the structure united to form a multi-ply material by passing through calender or squeeze rolls or by passing over suction boxes. Such an operation is diagrammatically illustrated in Figure 3, where the multi-ply material designated as 3 is shown entering the nip of the squeeze rolls 5 and emerging from the nip as a united structure of somewhat less thickness than the unpressed structure. Instead of employing dry pulp board in the formation of the multi-ply molding material, wet pulp board may be united with the expanded interlayer, as described above. In this latter case, it is necessary to dry the united structure in order to produce the desired molding material. This may be accomplished by passing the sheet structure, as the individual layers have been united as described, through heated can rollers. Such an operation is illustrated in Figure 4, where the united structure, designated as 3, is shown passing between the nip of two heated rollers 6. The united structure may be subjected to further pressure during such a heating operation or the heated rollers 6 may be so operated that the sheet is not subjected to pressure sufficient to cause any further diminution in thickness. There is a certain amount of interlocking between the two surface layers 4 of the multi-ply structure through the meshes in the interlayer, and this is particularly true when wet pulp board is used in its preparation, as described above.

As has been indicated above, the surface sheets of my molding materials comprise a substantial amount of a synthetic resin. Various resins, such as phenolic resins; synthetic elastomers, such as butadiene-styrene copolymers; allyl ester resins; urea-formaldehyde resins, and the like, may be used for this purpose. Because of the high structural strength obtained in the final product, however, phenolformaldehyde resins of the thermosetting type are preferred. The synthetic resins to be used in this invention should be capable of molding under heat and pressure so that when incorporated in my molding material, they are in a fusible state. In the case of thermosetting or heat convertible resins, suitable catalysts may be incorporated, in order that the resins in the structures will be converted into an insoluble and unfusible state during the molding operation.

The synthetic resin may be incorporated in my structure in various ways. The preferred method is to impregnate the pulp boards or sheets with the resin prior to application to the expanded interlayer. This impregnation may be accomplished by immersing the fibrous surface sheets in a solution of the synthetic resin in a suitable solvent, in a non-solvent dispersion, e. g., an aqueous emulsion of the synthetic resin or in a bath of the resinous material which is maintained at a temperature above the melting point of the resin. The synthetic resins may also be incorporated in the molding materials of this invention by treating the pulp in the pulp beaters or any other suitable stage in the manufacture of the pulp board with a water solution or dispersion of the synthetic resin. Such an impregnated sheet may be dry or may contain water or other volatile solvents when applied to the expanded interlayer, as described above.

Another method for applying the synthetic resin to the multi-layer structure is to first form a united structure free from resin in one of the ways described above and then impregnate the united structure with synthetic resin in a manner similar to that described for the impregnation of the fibrous sheet before union with the expanded interlayer. Although, molding materials, in which the surface sheets are impregnated with synthetic resin, produce molded articles of the greatest structural strength, it is also possible to apply the synthetic resin to the surface sheets by merely coating the sheets with the resin. As in the case of impregnation, the coating may be accomplished either before or after the surface sheets are united with the expanded interlayer. Such a coating operation may be accomplished by the use of brushes, doctor knives, doctor rollers or any suitable mechanism.

While the illustration of Figure 2 and the description above describe my molding material as a three-ply sheet, it is possible, where products of greater thickness or greater ultimate structural strength are desired, to utilize sheets of five, seven or multiple-ply construction.

Figure 5:
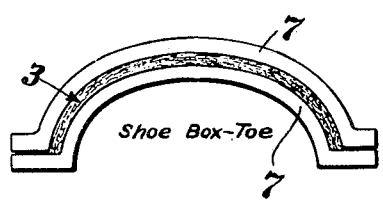
Figure 5 is a diagrammatic cross sectional view of a shoe box toe being molded from the molding material of this invention.
Figure 6:
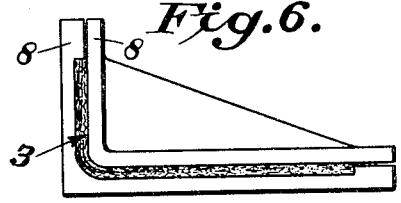
Figure 6 is a diagrammatic cross sectional view of an L-shaped form, such as a piece of corner molding, being molded from the molding materials of this invention.

One of the most important features of my molding materials is that, even though they are in a sheet form, they readily yield in all directions, so as to permit shapes having complex curves to be molded therefrom without rupture to the molding material. The molding operation used with my molding materials will depend, in part, upon the particular synthetic resin incorporated therein, the particular thickness of the molding material, the shape being molded and similar factors. Conditions of heat and pressure should be sufficient to mold the material into the desired shape and form a solid, rigid structure. In the case of thermosetting materials, the molding conditions should be sufficient to result in the heat conversion of the thermosetting resin, although it is unnecessary, this being a particular feature of my invention, to retain the article in the mold during the entire heat conversion operation. The compression molding of my molding material into a shoe box toe is shown in Figure 5, wherein the molding material 3 is being pressed between the mold dies 7. A similar operation, in which corner molding for desk tops, kitchen tables, and the like, is being conducted, is illustrated in Figure 6, in which the molding material 3 is being compressed under heat and pressure between the dies 8 of an angular mold.

I claim:

1. A laminated molding material comprising a fibrous sheet having a plurality of slits and stretched so as to have a flexible open mesh structure, and unbroken surface sheets secured to said first sheet, said surface sheets being impregnated with a moldable synthetic resin and being interlocked through the mesh of the first-mentioned sheet.

2. A laminated molding material comprising a substantially flat fibrous sheet having a plurality of slits and stretched so as to have a flexible open mesh structure, and substantially flat unbroken surface sheets secured to said first sheet, said surface sheets being impregnated with a moldable synthetic resin and being interlocked through the mesh of the first-mentioned sheet.

3. A shaped molded structure comprising a shaped fibrous sheet having a plurality of slits and stretched so as to have a flexible open mesh structure, and shaped unbroken surface sheets secured to said first sheet, said surface sheets being impregnated with a thermoset resin and being interlocked through the mesh of the first-mentioned sheet.

HAROLD E. READ.

REFERENCES CITED

The following references are of record in the file of this patent:

UNITED STATES PATENTS

| Number | Name | Date |
|---|---|---|
| 1,274,324 | Poetschke | July 30, 1918 |
| 1,325,363 | Lindsay | Dec. 16, 1919 |
| 1,414,420 | Kempton | May 2, 1922 |
| 1,469,220 | Kemp | Oct. 2, 1923 |
| 1,917,456 | Mickelson | July 11, 1933 |
| 2,001,632 | Schlichting | May 14, 1935 |
| 2,033,727 | Miller et al. | Mar. 10, 1936 |
| 2,202,014 | Lougheed | May 28, 1940 |